(12) United States Patent
Sixta et al.

(10) Patent No.: US 10,648,129 B2
(45) Date of Patent: *May 12, 2020

(54) PROCESS FOR PRODUCING A PULP

(71) Applicant: Lenzing Aktiengesellschaft, Lenzing (AT)

(72) Inventors: Herbert Sixta, Lenzing (AT); Andrea Promberger, Ottnang (AT); Andrea Borgards, Steinbach (AT); Roland Möslinger, Zell am Pettenfirst (AT)

(73) Assignee: Lenzing Aktiengesellschaft, Lenzing (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,996

(22) Filed: Dec. 28, 2017

(65) Prior Publication Data
US 2018/0119345 A1 May 3, 2018

Related U.S. Application Data

(60) Continuation of application No. 13/930,065, filed on Jun. 28, 2013, now abandoned, which is a division of
(Continued)

(30) Foreign Application Priority Data

May 10, 2006 (AT) .................. A 807/2006

(51) Int. Cl.
| | | |
|---|---|---|
| D21C 1/02 | (2006.01) | |
| D21C 9/00 | (2006.01) | |
| D21C 9/08 | (2006.01) | |
| C08B 37/14 | (2006.01) | |
| D21C 3/22 | (2006.01) | |
| D21C 3/02 | (2006.01) | |

(52) U.S. Cl.
CPC ............... *D21C 1/02* (2013.01); *C08B 37/14* (2013.01); *D21C 3/22* (2013.01); *D21C 9/001* (2013.01);
(Continued)

(58) Field of Classification Search
CPC .......... D21C 1/02; D21C 9/001; D21C 9/002; D21C 9/004; D21C 9/08; C08B 37/14
See application file for complete search history.

(56) References Cited

U.S. PATENT DOCUMENTS 5,589,033 A * 12/1996 Tikka ................. D21C 1/00
162/19
6,210,801 B1 * 4/2001 Luo ..................... D01D 5/098
428/357
(Continued)

FOREIGN PATENT DOCUMENTS

WO WO-2005118923 A1 * 12/2005 ............... D01F 2/00

OTHER PUBLICATIONS

Rydholm, Pulping Processes, 1965, Interscience Publishers, chapter 15, pp. 663-665.*
(Continued)

*Primary Examiner* — Anthony Calandra
(74) *Attorney, Agent, or Firm* — Venable LLP

(57) ABSTRACT

The invention relates to a process for producing a dissolving pulp from a cellulosic starting material using the kraft process, comprising the step of cooking the starting material with a cooking liquor. The process according to the invention characterized in that the starting material is exposed to a steam treatment prior to cooking and that the pulp obtained by cooking is subjected to cold caustic extraction (CCE) in the course of further processing.

12 Claims, 9 Drawing Sheets

Related U.S. Application Data application No. 12/300,024, filed as application No. PCT/AT2007/000224 on May 9, 2007, now Pat. No. 8,500,956.

(52) U.S. Cl.
CPC .............. *D21C 9/002* (2013.01); *D21C 9/004* (2013.01); *D21C 9/08* (2013.01); *D21C 3/02* (2013.01)

(56) References Cited

U.S. PATENT DOCUMENTS

| | | | | |
|---|---|---|---|---|
| 6,533,896 | B1* | 3/2003 | Tikka | D21C 1/04 162/19 |
| 2001/0032711 | A1* | 10/2001 | Stromberg | D21C 3/02 162/17 |
| 2004/0020854 | A1* | 2/2004 | Ali | C08B 1/00 210/652 |
| 2005/0203291 | A1* | 9/2005 | Svenson | C07H 1/08 536/124 |
| 2007/0000627 | A1* | 1/2007 | Tan | D21C 1/00 162/30.11 |

OTHER PUBLICATIONS

Rydholm, Pulping Processes, 1965, Interscience Publishers, pp. 1166.*

Puls et al., Comparitive Removal of Hemicelluloses from Paper Pulps using Nitren, Cuen, NaOH, and KOH, 2006, Lenzinger Berichte, 86, pp. 63-70.*

\* cited by examiner

PROCESS FOR PRODUCING A PULP

The present application is a continuation of U.S. patent application Ser. No. 13/930,065 filed Jun. 28, 2013, which is a division of U.S. patent application Ser. No. 12/300,024 filed Nov. 7, 2008, which is a national stage filing under 35 U.S.C. § 371 to International Patent Application No. PCT/AT2007/000224, filed May 9, 2007, which claims priority to Austrian Patent Application No. A807/2006, filed May 10, 2006, the entire disclosure of each of which is incorporated by reference herein.

BACKGROUND OF THE INVENTION

Field of the Invention

The present invention relates to a process for producing a pulp from a cellulosic starting material using the kraft process.

In particular, the invention relates to a process for producing a high-yield pulp which is suitable for further processing into Viscose fibres and Lyocell fibres.

Dissolving pulps are processed predominantly into cellulosic fibres according to the Viscose and Lyocell process. In recent years, the cost position of regenerated fibres has deteriorated further in comparison to competing synthetic fibres. A reduction in pulp costs, which constitute the most important cost factor, would clearly improve the cost position of regenerated fibres.

Description of the Prior Art

Luo et al. have been able to show that conventional kraft pulp is suitable for the production of cellulosic fibres according to the Lyocell process after the average degree of polymerization (DP) has been adjusted via acid hydrolytic and oxidative degradation, respectively [WO 99/47733]. The kraft pulps produced according to said prior art exhibit a content of hemicellulose of at least 7% by weight. According to WO 99/47733, Lyocell fibres produced from those kraft pulps exhibit a hemicellulose content of at least 5 to 27% by weight. However, the measuring method used for determining the hemicellulose content is not disclosed.

However, the presence of low-molecular hemicellulose components has a negative impact on the process behaviour (accumulation of non-fibre-forming hemicellulose portions in the spinning bath; high expenditure of chemicals for the depolymerization for adjusting the desired DP) and the textile-mechanical properties (a strength lower by more than 5 cN/tex under conditioned circumstances in comparison to Lyocell fibres made of prehydrolysis kraft pulps) of the Lyocell fibres produced therefrom.

Since the development of "modified kraft cooking" in the early 80ies it has been known that a decrease in the concentration of dissolved wood ingredients in the final stage of cooking brings about a considerable increase in efficiency and selectivity.

In order to comply with this knowledge, it has been suggested that waste liquor streams rich in hemicellulose, which occur, for example, upon completion of the phase of parallel-flow cooking in continuous cooking processes (e.g.: MCC, EMCC), be withdrawn from the cooking process in order to make sure that the concentration level of the dissolved hemicelluloses drops down to values smaller than 10 g/l in the further cooking phase [WO 95/00698]. In a further step, the high-molecular hemicelluloses are concentrated further by means of pressure-driven membrane separation processes, before they are reprecipitated on the surface of the pulp fibres during final bleaching within the scope of an E-stage in order to increase, on the one hand, the yield, and, on the other hand, the static strength.

This suggestion indeed brings about an improved pulp yield, the disadvantage is, however, that the portion of hemicelluloses which has not been adsorbed (equilibrium reaction) inevitably accumulates in the bleaching filtrate, causes increased consumptions of bleaching chemicals and partly also reaches the sewage.

SUMMARY OF THE INVENTION

It is the object of the present invention to provide a process for producing pulp which solves the initially-described problems of pulp production according to the kraft process in an improved manner.

Said object is achieved by a process for producing a dissolving pulp from a cellulosic starting material using the kraft process, comprising the step of cooking the starting material with a cooking liquor, which is characterized in that the starting material is exposed to a steam treatment prior to cooking and that the pulp obtained by cooking is subjected to cold caustic extraction (CCE) in the course of further processing.

It has been shown that, with a combination of the measures of a steam treatment of the starting material prior to cooking and a CCE stage during further processing, a pulp can be obtained in high yield and purity, which pulp is excellently suitable for the production of Viscose and Lyocell fibres.

The steam treatment is preferably carried out at a temperature of 120° C. or more and a P-factor of 50 or less. That are considerably more intense conditions than with "low temperature steaming", as described, e.g., in WO 98/15687.

Under the conditions preferred according to the invention, an increase in the porosity of the digesting material (wood chips) as well as a partial splitting of the lignin-carbohydrate bonds is achieved by the steam treatment.

However, a chemical cleavage of glycosidic bonds does not yet occur, which would be the case in a prehydrolysis process. Typically, P-factors of more than 50 are achieved in a prehydrolysis process. The concept of the "P-factor" is described, for example, in the "Handbook of Pulp", vol. 1, Wiley-VCH 2006, pp. 343-345. The intensity of the steam treatment according to the invention preferably amounts to only about one tenth of that of a conventional prehydrolysis.

This means that, with the steam treatment as provided according to the invention, a higher yield of pulp and thus a more economic production can be achieved in contrast to prehydrolysis processes. Indeed, the pulp obtained also contains a higher amount of hemicelluloses, but, as a result of the combination according to the invention of the steps of steam treatment and cold caustic extraction, it is apparently achieved that the pulp is nevertheless excellently suitable for the production of cellulose fibres.

For the steam treatment, the starting material is treated with medium-pressure steam particularly preferably at a temperature of from 150 to 180° C.

In a manner known per se, the starting material can be subjected to an impregnation prior to cooking. If a steam treatment is carried out as well, impregnation occurs after the steam treatment.

In the process according to the invention, the cooking and optionally the steam treatment and/or the impregnation of the starting material may be carried out in the same cooker.

In the process according to the invention, cooking is preferably carried out in the form of continuous batch cooking (CBC). The CBC-technology is known, e.g., from EP 0 891 438 B1 as well as from Wizani, W., et al. "CBC—Continuous batch cooking. The revolution in kraft cooking" in *Pulping process and product quality conference*, 2000, Boston, Mass., USA.

When CBC-technology is applied, the steps of impregnation and hot displacement (i.e., the displacement of the impregnating liquor by cooking liquor) correspond to the methods commonly used in the CBC-technology.

The kraft pulps produced according to the invention may be subjected to TCF or ECF bleaching in a manner known per se in order to achieve the required degrees of purity and whiteness.

In a further preferred embodiment, a portion of the press liquor forming in the cold caustic extraction stage can be purified using a membrane separation process, preferably nano- or ultrafiltration, and at least a portion of the retentate of the membrane separation process can be admixed to the second cooking liquor.

The purification of the press liquor of a CCE process using a membrane separation process is described in WO 2005/118923. The retentate accumulating thereby contains the entire amount of the beta-cellulose present in the press liquor and more than half of the gamma-cellulose. In case of hardwood pulps, the beta-cellulose solution consists of almost pure xylan.

The membrane separation process may be carried out in two stages, with a dilution of the retentate of the first stage with water being performed between the two separation stages.

In doing so, a nanofiltration of the diluted retentate or also a dialysis of the retentate of the first stage may be carried out in the second stage. In both cases, the NaOH recovery is increased by said step, with the hemicellulose phase being concentrated at the same time.

Thus, instead of or in addition to the recirculation of the retentate to the second cooking liquor, from at least a portion of the retentate of the membrane separation process the hemicelluloses contained therein, in particular xylans, can be obtained. In US 2005/0203291, a process for obtaining xylans from a phase rich in xylans is described.

In contrast to said known process, in a preferred embodiment of the process according to the invention, precipitable hemicelluloses, in particular xylans, are obtained from the retentate of the membrane separation process by reverse precipitation.

For the reverse precipitation, an agent from the group consisting of mineral acids, $CO_2$ and monovalent or polyvalent alcohols is preferably used. Subsequently, the sedimentation residue can be washed in suitable installations (e.g., a washing press) and dehydrated mechanically.

The xylans thus obtained may be processed at least partially into xylo-oligosaccharides. Xylo-oligosaccharides have various applicabilities, e.g., as a food additive with prebiotic effect.

For producing said xylo-oligosaccharides, a process selected from the group consisting of hydrothermolysis and enzymatic hydrolysis may preferably be carried out.

A further preferred embodiment of the process according to the invention is characterized in that said process is linked to a process for producing a paper pulp and at least a portion of the press liquor forming in the cold caustic extraction stage and/or at least a portion of the retentate of a membrane separation process performed on the press liquor is/are supplied to the cooking liquor of a cooking process carried out for the production of paper pulp.

By linking the productions of dissolving pulp and paper pulp and utilizing the stock flows accumulating in the CCE step of the process according to the invention during the production of paper pulp, both a qualitative and an economic improvement of the paper pulp production process becomes possible.

The filtrate of the CCE stage or the retentate of a nano-filtered CCE filtrate contains, as already explained above, a high content of hemicellulose. A cooking liquor enriched with hemicellulose is particularly suitable for the production of high-yield paper pulps with an increased hemi content.

A further preferred embodiment of the process according to the invention is characterized in that the pulp obtained by cooking in the course of further processing, in addition to a bleaching step which has optionally been carried out, is subjected to a treatment for adjusting the degree of polymerization (DP).

The treatment is preferably selected from the group consisting of oxidative bleaching methods, acid hydrolytic methods and electron irradiation methods.

The DP-degradation of pulps to a desired DP-level may occur in a chemical-oxidative manner as well as by electron irradiation. Hypochlorite or ozone treatments are best suited as oxidants for the DP-degradation. A disadvantage of chemical-oxidative methods is the fact that the chain degradation proceeds in a very heterogeneous manner due to a restricted accessibility (of the oxidants) in crystalline regions, whereby the molar mass distribution remains considerably broader than what would correspond to a statistical degradation.

In contrast, the electron irradiation shows a largely statistical degradation so that the polydispersity of the molar mass distribution decreases with an advancing DP-degradation to a considerably larger extent than in case of chemical-oxidative degradation methods, as could be demonstrated using the example of ozone treatment.

The electron irradiation of pulps for the purpose of DP-adjustment is known per se and has already been studied by many project groups [e.g., Kukielka, A., et al., Electron-beam treatment of cellulose pulps for production derivatives. Zeszyty Naukowe Politechniki Slaskiej, Chemia, 2001. 146: p. 117-120; Iller, E., et al., Electron-beam stimulation of the reactivity of cellulose pulps for production of derivatives. Radiation Physics and Chemistry, 2002. 63: p. 253-257; Stepanik, T. M., D. E. Ewing, and R. Whitehouse, Electron treatment of wood pulp for the viscose process. Radiation Physics and Chemistry, 2000. 57: p. 337-379].

In those papers, the authors proceed on the assumption that the electron irradiation is used as a substitute for the alkaline ripening of the alkali cellulose of finished pulps. Since electron irradiation leaves highly reactive groups in the pulp (carbonyl groups), a subsequent alkaline treatment will, however, cause a further strong DP-degradation and the formation of chromophoric structures in the alkali cellulose.

The use of irradiated pulp has an even more adverse effect in the Lyocell process. In this case, the reactive groups induce degradation reactions of the solvent NMMO, the degradation products of which will in turn continue to do damage to the cellulose. This is one of the reasons why a DP-adjustment via electron irradiation has so far not been carried out in practice.

The present invention avoids this problem by exposing the pulps to an electron irradiation ("E-Beam" treatment) at arbitrary positions of the fibre line, i.e., during the manufacturing process of the pulp, starting from the unbleached pulp up to before the final bleaching stage.

The electron irradiation of the pulp may preferably be performed such that the pulp is present in a stock density of at least 35%, preferably of 40-50%, and in a layer thickness of from 2 to 6 mm, preferably from 3 to 4 mm, and an accelerating voltage of less than 2.5 MeV is applied.

Layer thicknesses of between 2 and 6 mm can be penetrated by radiation in a largely homogeneous manner also at low accelerating voltages. The water content present in the pulp fleece must of course be taken into account for the selection of the radiation dosage. With a stock density of 50%, the dose required for a particular DP-degradation increases approximately twofold.

A further advantageous embodiment of the process according to the invention is that an alkaline-oxidative treatment, preferably an alkaline peroxide treatment, is carried out after the treatment for adjusting the degree of polymerization.

Instable groups resulting in particular from an electron irradiation are stabilized by said subsequent alkaline peroxide stage and are thus unable to exert a negative impact on the processes of subsequent treatment. In a peroxide (P) stage following an EBeam stage, the carbonyl groups are oxidized, for the most part, into carboxyl groups. Short-chain compounds comprising highly chromophoric groups, which are leached out into the bleaching filtrate, are thereby formed. The high-molecular, oxidized residues are present largely as aldonic acid groups and are thus stable against subsequent alkaline treatments.

Typical process concepts for the application of an electron irradiation are listed below:
TCF-bleaching Sequence:
W-EBeam-OP-A-Z-P; W-EBeam-OP-A-P, W-EBeam-OP-P, W-OP-A-Z-EBeam-P, W-OP-A-EBeam-P, W-OP-EBeam-P.
ECF-bleaching Sequence:
W-EBeam-OP-D-E-P; W-EBeam-OP-D-E-D, W-EBeam-D-E-D, W-D-E-EBeam-P Thereby, the abbreviations used mean the following: W . . . washing, OP . . . peroxide-reinforced oxygen delignification, E . . . alkaline extraction, D . . . chlorine dioxide stage, Z . . . ozone stage, P . . . alkaline peroxide stage.

A further preferred embodiment of the process according to the invention is characterized in that the cooking step of the pulp is carried out in two stages, wherein, in the first stage, a delignification using a first cooking liquor to a kappa number of from 35 to 70 in case of softwoods as the starting material and to a kappa number of from 30 to 60 in case of hardwoods as the starting material is carried out and, in the second stage, the cooking is continued to the desired degree of purity of the pulp, using a second cooking liquor.

Said embodiment is thus based on the concept of two-stage kraft cooking.

The object of the first cooking stage is to perform the main part of bulk delignification. In doing so, according to the invention, softwoods are delignified to a kappa number of from 35 to 70, and hardwoods, respectively, are delignified to a kappa number of from 30 to 60.

The proportion of the H-factor of the first cooking stage preferably amounts to 40% to 80%, based on the H-factor of both cooking stages together, in case of softwoods as the starting material and, respectively, amounts to 20% to 60% in case of hardwoods as the starting material.

The H-factor defines the relative velocity of lignin dissolution and depends on the cooking time and the temperature. H-factor 1 corresponds to a cooking time of 1 hour at 100° C. The H-factor thereby expresses cooking time and cooking temperature as a single variable. A relative reaction rate (with reference to a temperature of 100° C., where the reaction rate, by definition, amounts to 1), which is calculated by means of an Arrhenius approach using a particular activation energy, is integrated over the time of cooking.

During the transition from the first to the second cooking stage, the first cooking liquor is preferably replaced by the second cooking liquor. For example, in case of a continuous cooking process, the supply of the first cooking liquor can be stopped and, at the same time, the supply of the second cooking liquor from a second cooking liquor tank can be started. The selection of suitable flow rates thereby permits a largely complete charging of cooking liquors during both cooking phases.

Preferably, the first cooking liquor has an EA (effective alkali) concentration of from 10 g/L to 30 g/L, preferably from 15 g/L to 25 g/L, particularly preferably of 20 g/L, as well as a sulfidity of from 50% to 120%, preferably of 100%. According to the testing method SCAN-N 30:85, the sulfidity S is defined as $S=2[HS]/([OH]+[HS])$.

In a further preferred embodiment, the composition of the second cooking liquor differs from that of the first cooking liquor.

The composition of the second cooking liquor can be adjusted to the respective requirements of the pulp quality in particular by adding suitable liquor streams.

Preferably, the second cooking liquor can be enriched with a liquor selected from the group consisting of the filtrate of a subsequent washing stage, a white liquor from caustification and the press liquor from a cold caustic extraction stage.

In the process according to the invention, both cooking stages are preferably carried out in the form of a continuous batch cooking (CBC). This technology offers in particular higher flexibility with regard to the design of the second cooking stage. In case of modified continuous cooking processes, the addition of a cooking liquor either rich or low in hemicellulose in the counterflow cooking zone (MCC and EMCC/ITC cooking processes) or in the expanded cooking zone (EMCC/ITC cooking process) is possible.

The present invention also relates to the use of the dissolving pulps produced according to the invention for the production of Viscose and Lyocell fibres.

The processes of producing Viscose and Lyocell fibres are known per se to a person skilled in the art.

Lyocell fibres which are obtainable by the spinning of a dissolving pulp produced according to the invention are characterized in particular by the following features:

Their content H of hemicellulose preferably exceeds 3.5% by weight and is thus slightly higher than the hemicellulose content of Lyocell fibres which are manufactured from high-quality prehydrolysis kraft pulps which are complicated to produce (i.e., in particular with a comparatively low yield), as described, e.g., in WO 94/12719. The content H may amount to less than 5% by weight.

Despite this increased content of hemicellulose, the yield of mercerization of the Lyocell fibre according to the invention (according to the measuring method described below) amounts to 90% or more. Thus, the Lyocell fibre according to the invention has a considerably higher fastness to mercerization than Lyocell fibres which are produced from a kraft pulp not according to the invention having a high hemicellulose content, as described, e.g., in WO 99/47733.

The strength of the Lyocell fibre according to the invention amounts to 37 cN/tex or more in the conditioned state and is thus in the same order of magnitude which so far has been achievable only by using high-quality prehydrolysis kraft pulps which are complicated to produce.

The Lyocell fibre produced according to the invention differs from Lyocell fibres produced from such high-quality prehydrolysis kraft pulps also in that the average molar mass of the xylans isolable from the fibre amounts to 20 kDa or more (see the measuring method described further below). In contrast, xylans from Lyocell fibres, which originate from high-quality prehydrolysis kraft pulps (or also from sulfite pulps), exhibit a weight average (Mw) of ≤10 kDa.

In total, the Lyocell fibres according to the invention are thus clearly distinguishable from previously known fibres and have the advantage that they exhibit excellent fibre properties despite the use of the dissolving pulp which can be manufactured comparatively cheaply in accordance with the process according to the invention.

The present invention also relates to a Viscose fibre which is obtainable by spinning a dissolving pulp produced according to the invention.

The Viscose fibre according to the invention is characterized, in particular, by the fact that its content H of hemicellulose amounts to more than 2.0% by weight and its fastness to mercerization reaches 90% or more. Despite a high hemicellulose content, the strengths of the Viscose fibre according to the invention meet the standard of the best Viscose fibres which are produced from high-quality prehydrolysis kraft pulps (or also from sulfite pulps). In particular, the Viscose fibre according to the invention can exhibit a strength of 23 cN/tex or more in the conditioned state and an elongation of 18% or more in the conditioned state.

BRIEF DESCRIPTION OF THE DRAWINGS

Below, the present invention is explained in further detail based on the figures and examples.

DETAILED DESCRIPTION OF THE INVENTION

Figure 1:
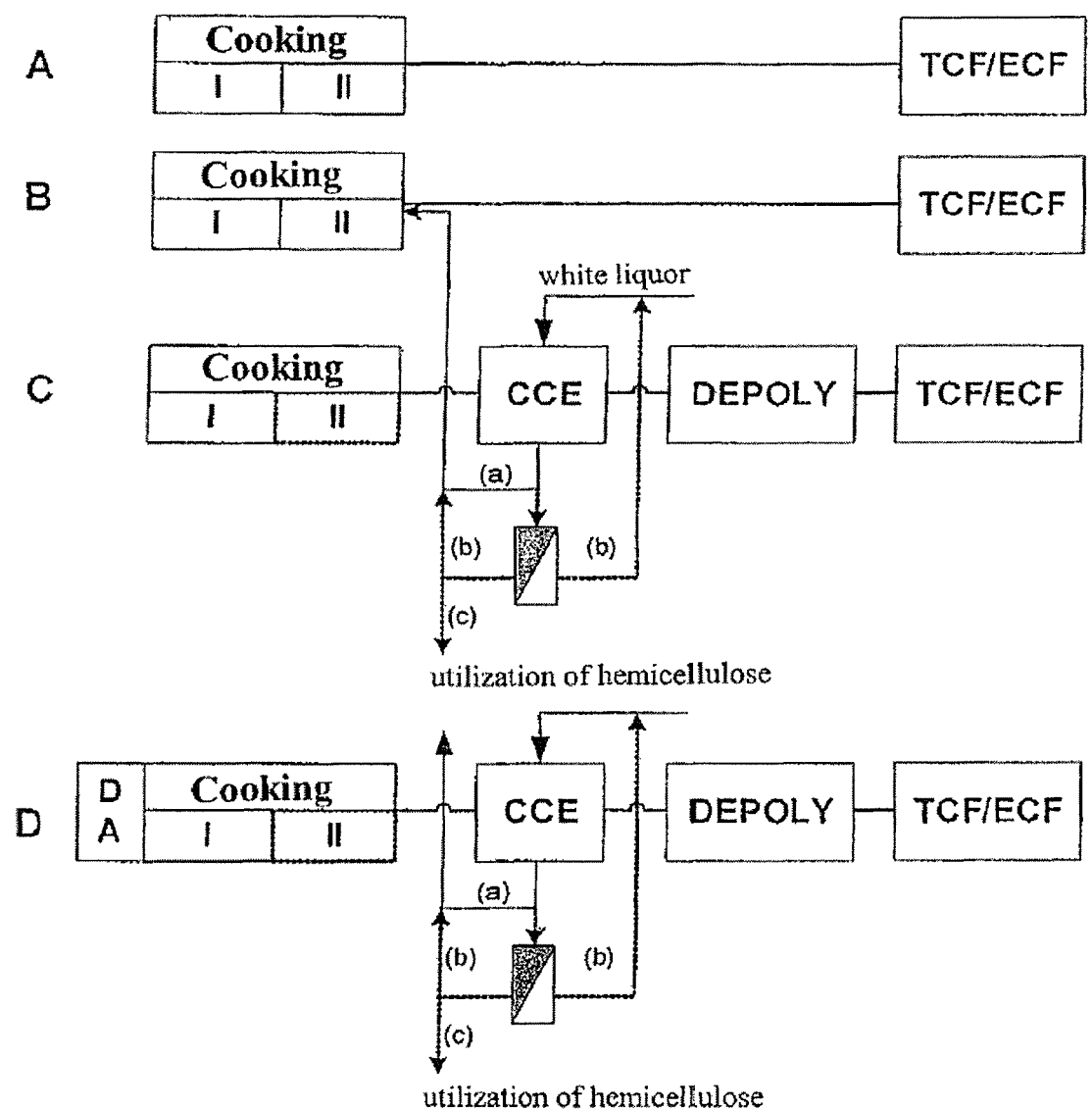
FIG. 1 shows a diagram of the basic concept of the process according to the invention and its applicabilities.

In FIG. 1, the basic concept of the process according to the invention and the various applicabilities thereof are illustrated schematically.

Variant A shows the production of a paper pulp having a high strength potential: for this purpose, a two-stage kraft process (as a batch process or, e.g., as a CBC process) is combined with a TCF or ECF bleaching sequence. The two-stage operation permits optimum adjustment of the cooking conditions to the respective requirements.

Variant B shows the concept of the production of a high-yield paper pulp (a pulp with an increased hemicellulose content): For this purpose, the process proceeds basically identically to variant A. In this case, however, the cooking liquor for the second stage of cooking is enriched with high-molecular hemicellulose from a liquor rich in hemicellulose. Said liquor rich in hemicellulose may result in particular from a CCE process which is carried out in a process C for the production of a high-yield Lyocell pulp, which process is linked to process B. The liquor rich in hemicellulose may be, for example, (a) the CCE filtrate or (b) the retentate of a nanofiltered CCE filtrate.

The variant C already mentioned in FIG. 1 results in a high-yield Lyocell pulp for the production of Lyocell fibres having the highest possible textile-mechanical strength properties: The basic scheme proceeds according to variant A. However, the cooked pulp is treated either directly after washing and sorting or after each bleaching or depolymerization step ("DEPOLY"), respectively, preferably after an O-stage, in a CCE refining stage.

In combination with a paper pulp production occurring parallel thereto, see scheme B, CCE filtrate may be used for the fortification of white liquor, preferably in the second cooking stage.

If the paper pulp production is absent or too low, the liquor can be recycled via nanofiltration after purification. The permeate (b) is returned to the CCE stage, hemicelluloses can be obtained from the retentate (c).

Variant D in FIG. 1 shows a preferred embodiment of the process according to the invention for the production of high-yield dissolving pulps, those are in particular (a) viscose pulp for fibres having high textile-mechanical properties, (b) all other dissolving pulps which are derivatized into cellulose ester or ether.

The basic scheme proceeds according to variant C. In order to improve the pulp reactivity, the wood is subjected to a steam activation treatment (DA stage) in which the composite structure of the wood is loosened a lot with the aim of selectively separating the low-molecular hemicelluloses in the subsequent alkaline cooking.

EXAMPLES

Example 1

Two-stage CBC Cooking of Whitewood

Whitewood is cooked to pulp with kappa numbers of between 16 and 42 in a test cooker of 10.8 l according to the CBC process (continuous batch cooking). The single-stage reference cooking has the following conditions:

Impregnation: [OH—]=0.37 mol/l, [HS—]=0.22 mol/l; mean temperature 120° C., 30 min (filling direction from below to above)

Heating: Displacement of the impregnating liquor by a preset cooking liquor (direction of displacement from above to below). After 28 minutes, the target temperature of 160° C. is reached.

Cooking stage: Cooking liquor is pumped through the cooker from above to below at a flow rate of twice the cooker volume per hour: 160° C., [OH—]=0.62 mol/l, [HS—]=0.30 mol/l, H-factors: 800-1600.

Impregnation and heating of the two-stage CBC cooking according to the invention were carried out along the lines of the single-stage variant.

Cooking stage 1: 160° C., [OH—]=0.48 mol/l, [HS—]=0.48 mol/l, H-factor=750=constant Cooking stage 2: 160° C., [OH—]=0.62 mol/l, [HS—]=0.32 mol/l, the H-factor was varied from 100 to 600.

Two variants of the two-stage CBC cooking were carried out, the difference between them was merely the concentration of dissolved substances:
a) DS~80 g/l (standard)
b) DS~40 g/l (low solid-CBC)

Figure 2:
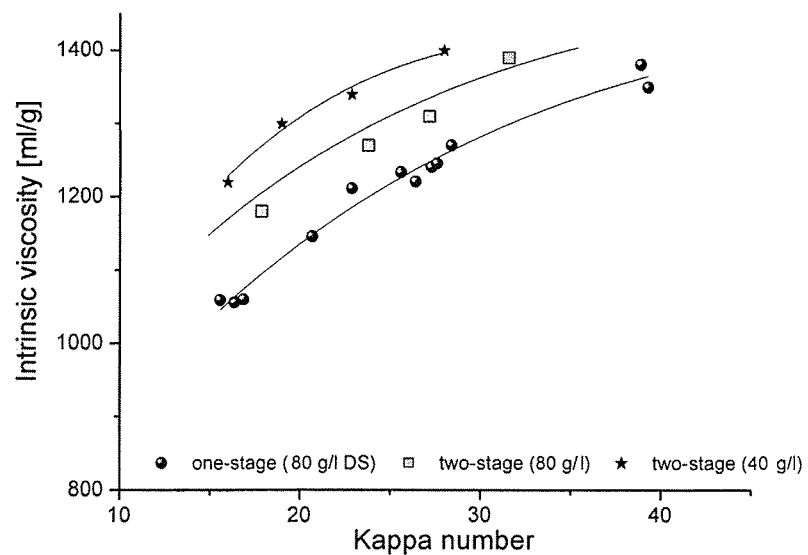
FIG. 2 shows a plot of intrinsic viscosity versus kappa number of single and two-stage CBC cookings of whitewood.

The test results are summarized in FIG. 2 on the basis of a selectivity plot (intrinsic viscosity number versus kappa number). The results show that the already high selectivity of the single-stage CBC cooking can be improved further by the two two-stage variants.

Figure 3:
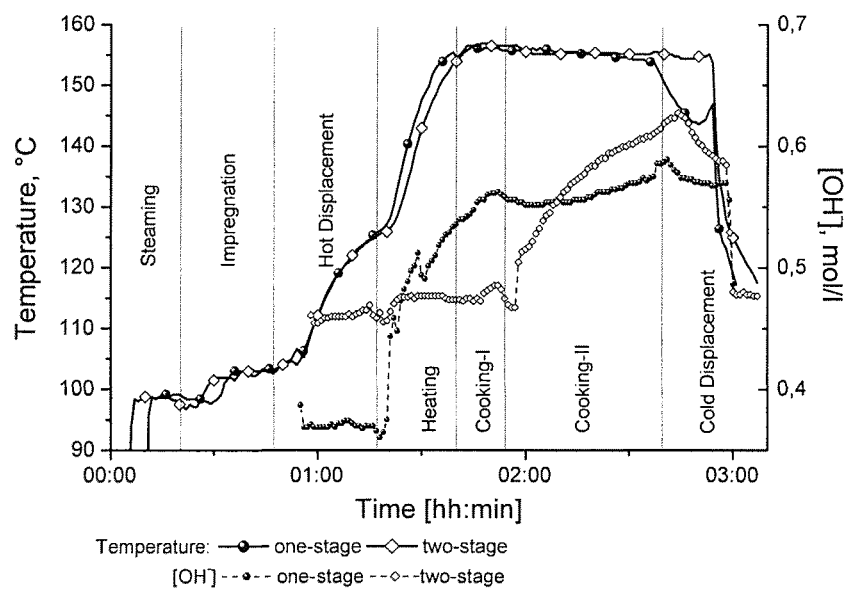
In FIG. 3, temperature and hydroxide ion profiles of single and two-stage softwood-CBC cookings are illustrated.

In FIG. 3, temperature and hydroxide ion profiles of the above-described single and two-stage softwood-CBC cookings are illustrated.

As shown in FIG. 3, a two-stage operation—in case of identical degrees of delignification—does not result in a prolongation of the cooking time. The hydroxide ion concentration in the cooker outlet shows a rapid increase in the course of the second cooking stage and reaches the target concentration already after half of the cooking time that has been chosen.

Example 2

Two-stage CBC Cooking of *Eucalyptus globulus*

*Eucalyptus globulus* is processed into pulp with kappa numbers of between 13 and 28 in a test cooker of 10.8 l according to the CBC process (continuous batch cooking).

The single-stage reference cooking (one-stage) has the following conditions:

Impregnation: [OH—]=0.38 mol/l, [HS—]=0.25 mol/l; mean temperature 120° C., 30 min (filling direction from below to above)

Heating: Displacement of the impregnating liquor by a preset cooking liquor (direction of displacement from above to below). After 30 minutes, the target temperature of 155° C. is reached.

Cooking stage: Cooking liquor is pumped through the cooker from above to below at a flow rate of twice the cooker volume per hour: 155° C., [OH—]=0.65 mol/l, [HS—]=0.34 mol/l, H-factors: 200-500.

Impregnation and heating of the two-stage CBC cooking (two-stage) were carried out along the lines of the single-stage variant.

Cooking stage 1: 155° C., [OH—]=0.46 mol/l, [HS—]=0.37 mol/l, H-factor=180=constant Cooking stage 2: 155° C., [OH—]=0.62 mol/l, [HS—]=0.37 mol/l, the H-factor was varied from 100 to 400.

In a second variant, the cooking liquor of the second stage was produced with the hemi-rich filtrate of a CCE treatment.

Thereby, the conditions in cooking stage 2 were adjusted as follows: 155° C., [OH—]=0.37 mol/l, [HS—]=0.16 mol/l, beta-cellulose concentration (from CCE filtrate)=10 g/l, H-factor=150-400.

Figure 4:
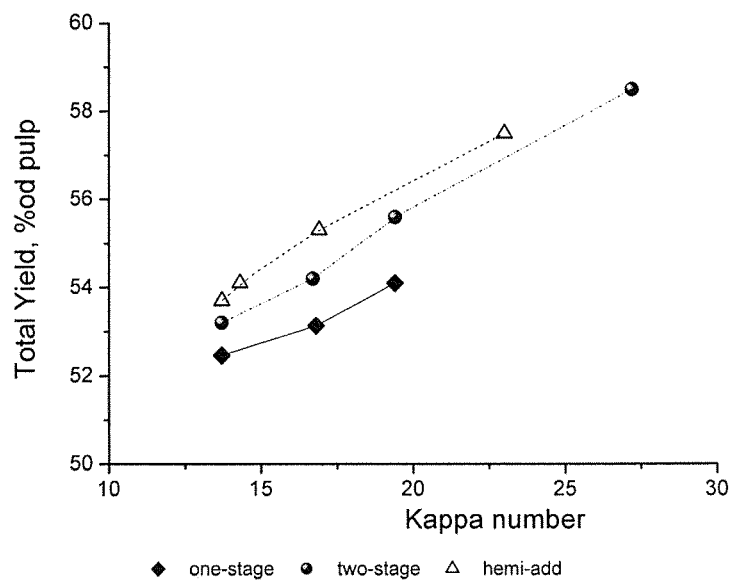
FIG. 4 shows a plot of total yield versus kappa number of single and two-stage *Eucalyptus globulus* CBC cookings with and without accumulation of hemicellulose.

As is evident from FIG. 4, the yield could be considerably improved in the entire kappa number range for both the "simple" two-stage variant ("two-stage") and the two-stage variant reinforced with hemicellulose ("hemi-add") in comparison to the single-stage mode of operation.

Figure 5:
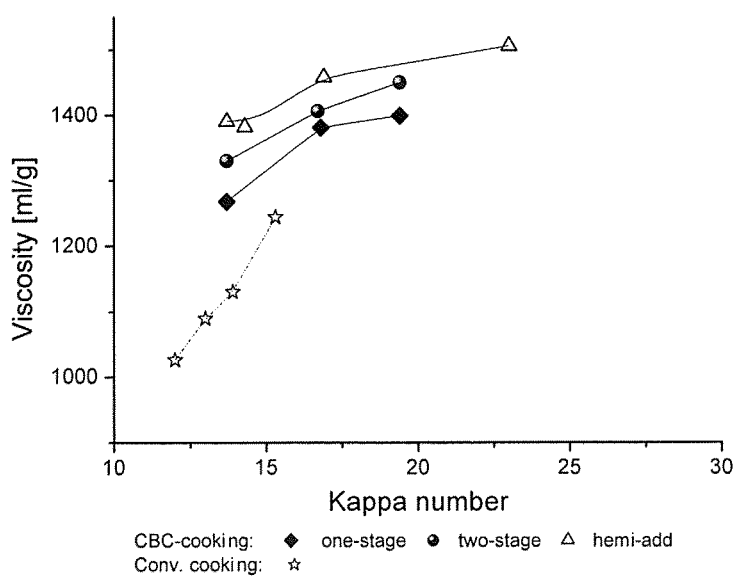
FIG. 5 shows a plot of intrinsic viscosity number versus kappa number of single and two-stage *Eucalyptus globulus* CBC cookings with and without accumulation of hemicellulose.

The advantage of the two-stage process control also reveals itself in the digestion selectivity, which is illustrated in FIG. 5 as the plot of intrinsic viscosity number versus kappa number.

What is remarkable is that the cooking selectivity, i.e., the intrinsic viscosity at a particular kappa number, is very high after all CBC cookings in comparison to *Eucalyptus globulus* cookings produced in a conventional manner.

Example 3

Production of High-yield Dissolving Pulps for Further Processing into Viscose and Lyocell Fibres Prior to the beginning of CBC cooking, the wood was exposed to steam activation (DA) by bringing the content of the cooker to a temperature of approx. 165° C. with the aid of medium-pressure steam. CBC cooking was carried out in a single stage.

For better identification, the combination of the processes DA+CBC is subsequently indicated by "CBC*". After O-delignification, CBC* pulp was subjected to a cold caustic extraction with the aim of removing the hemicelluloses soluble in alkali. DP-adjustment was effected by ozone treatment (Z) within the scope of final bleaching. The subsequent P-bleaching served for the stabilization of the cellulose and for the adjustment of the desired final degree of whiteness. As a reference pulp, a prehydrolysis kraft pulp was produced by means of "VISCBC" technology (modified visbatch process, see Wizani, W, et al. "CBC—Continuous batch cooking. The revolution in kraft cooking" in *Pulping process and product quality conference*, 2000, Boston, Mass., USA).

The following table 1 shows the most important characteristics of unbleached pulps.

TABLE 1

Characterization of unbleached *E. globulus* pulps: CBC* pulp (paper pulp) and VISCBC cooking process, as a reference for a conventional dissolving pulp.

| Parameters | | Wood | CBC* #134 | VISCBC #141/142 |
|---|---|---|---|---|
| P-Factor | | | 0 | 490 |
| Yield, sorted | % | 100.0 | 52.9 | 37.2 |
| Cellulose yield | % wood | 46.1 | 41.0 | 34.9 |
| Kappa number | | | 13.1 | 6.0 |
| Intrinsic viscosity | ml/g | | 1281 | 963 |
| Whiteness | % ISO | | 37.7 | 42.8 |
| R18-20° C. | % pulp | | 92.6 | 96.9 |
| R18-50° C. | % pulp | | 84.4 | 96.2 |
| Xylan | % pulp | 16.0 | 18.4 | 3.1 |
| | % wood | 16.0 | 9.7 | 1.1 |

Thereby, the P-factor expresses the intensity of prehydrolysis. The calculation is based on the same concept as with the H-factor, with a different activation energy (123 kJ/mol) being used.

The yield (cellulose content) of the CBC* pulp was higher by 15.7 percentage points (6.1 percentage points) in comparison to the VISCBC reference pulp (see Table 1).

Subsequently, the bleaching of the CBC* and VISCBC pulps was finished with the aid of an OZP-TCF sequence. In order to reduce the low-molecular hemicelluloses, the CBC* pulps were subjected to a cold caustic extraction after O-delignification (CCE stage).

The CCE treatment was carried out at two different NaOH concentration levels, 50 g/l and 100 g/l. A white liquor having a sulfidity of 26% served as an alkali source. All other conditions such as temperature (30° C.), residence time (30 min) and stock density (10%) were kept constant in both experiments.

Final bleaching was performed in all pulps with the aid of a Z-P-sequence, wherein the object of ozone bleaching consisted primarily in adjusting the DP to the level for regenerated pulps (DP of 950-1200, corresponding to an intrinsic viscosity number GVZ of 420-500 ml/g). The most essential process and pulp data (within the scope of pulp bleaching) are listed in the following Table 2.

process. The Willis "CBC two-stage" and "CBC hemi-add" thereby refer to pulps produced according to Example 2 with and without accumulation of hemicellulose. The graph "β-xylan" refers to xylan isolated from the CCE stage in an isolated manner.

Figure 6:
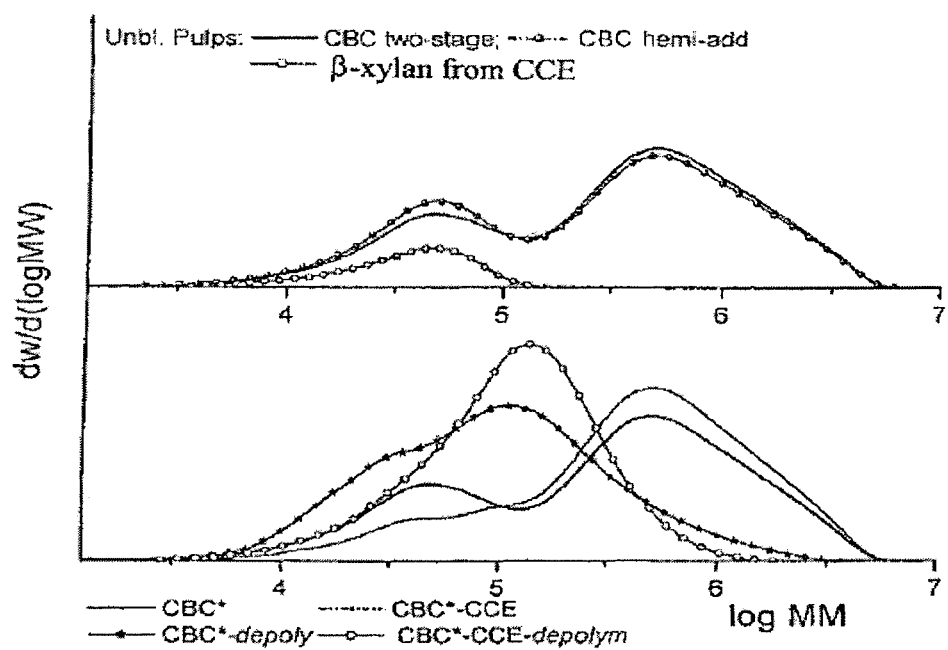
FIG. 6 shows the molar mass distribution of *Eucalyptus globulus* kraft pulps.

The lower part of FIG. 6 illustrates the following pulps:
(a) CBC*: unbleached CBC pulp after steam activation
(b) CBC*depoly: CBC* after TCF bleaching
(c) CBC*-CCE: CBC* after CCE treatment at a NaOH concentration of 100 g/l
(d) (c) TCF bleached.

The molar mass distribution was determined via GPC in a LiCl/DMAc and MALLS detection [Schelosky, N., T. Röder, and T. Baldinger, *Molecular mass distribution of cellulose products by size exclusion chromatography in DMAC/LiCl*. Das Papier, 1999. 53(12): p. 728-738].

The lower part of FIG. 6 clearly shows that the CCE treatment removes the low-molecular carbohydrate fraction very effectively and selectively.

A comparison with the molar mass distribution of conventional, high-grade finished dissolving pulps, which were

TABLE 2

Characterization of bleached high-yield *E. globulus*-CBC*-CCE dissolving pulps and, as a reference, a bleached VISCBC dissolving pulp.

| Parameters | Units | CBC* reference | | | CBC*-CCE50 | | | | CBC*-CCE100 | | | | VISCB reference | | |
|---|---|---|---|---|---|---|---|---|---|---|---|---|---|---|---|
| | | O | Z | P | O | CCE | Z | P | O | CCE | Z | P | O | Z | P |
| Conditions | | | | | | | | | | | | | | | |
| Temperature | ° C. | 110 | 50 | 80 | 110 | 30 | 50 | 70 | 110 | 30 | 50 | 70 | 110 | 50 | 80 |
| Residence time | min | 60 | | 240 | 60 | 30 | | 120 | 60 | 30 | | 120 | 60 | | 300 |
| Stock density | % | 12 | 10 | 10 | 12 | 10 | 10 | 10 | 12 | 10 | 10 | 10 | 12 | 10 | 10 |
| NaOH charge | kg/t | 25 | | 12 | 25 | | | 6 | 25 | | | 6 | 25 | | 9.3 |
| NaOH concentration | g/l | | | | | 50 | | | | 100 | | | | | |
| O2 partial pressure | bar | 10 | | | 10 | | | | 10 | | | | 10 | | |
| Ozone charge | kg/t | | 11.87 | | | | 6.8 | | | | 3.5 | | | 2.8 | |
| Peroxide charge | kg/t | | | 10 | | | | 5 | | | | 5 | | | 6 |
| Pulp parameters | | | | | | | | | | | | | | | |
| Total yield | %/wood | 51.7 | 50.83 | 50.3 | 51.7 | 47.1 | 46.9 | 46.6 | 51.7 | 45.2 | 45.1 | 44.9 | 36.6 | 36.4 | 36.2 |
| Kappa number | | 7.7 | 1.2 | 0.5 | 7.7 | 4.5 | 0.5 | 0.3 | 7.7 | 2.9 | 0.4 | 0.3 | 1.8 | 0.4 | 0.2 |
| Whiteness | % ISO | 66.4 | 84 | 89.0 | 66.4 | | 90.2 | 92.5 | 66.4 | | 91.4 | 93.6 | 70.2 | 88.2 | 92.4 |
| Intrinsic viscosity | ml/g | 893 | 498 | 470 | 893 | 984 | 490 | 475 | 893 | 1026 | 490 | 465 | 650 | 490 | 455 |
| R18-20 | % | | | 93.1 | | 96.1 | | 96.4 | | 98.7 | | 97.8 | | | 97.0 |
| Xylan | % | | | 17.3 | | 9.6 | | 9.3 | | 4.7 | | 4.2 | | | 2.9 |

From Table 2 it becomes clear that the CCE treated CBC* pulps exhibit an R18 level which lies in the range of high-grade finished prehydrolysis kraft pulps (VISCBC reference). In contrast, the yield of bleached CBC*-CCE materials is by 8.7-10.4 percentage points higher than that of the reference pulp.

The advantage in yield can largely be traced back to the higher cellulose content. The higher xylan content (alkali resistant) of CBC*-CCE pulps also contributes to the higher yield, with said proportion decreasing with an increasing NaOH concentration in the CCE stage.

A simple balance shows that the CCE treatment removes non-cellulosic polysaccharides very selectively, whereas an intensive prehydrolysis also causes a massive breakdown of cellulose.

An important criterion for the assessment of dissolving pulps, especially with regard to their properties of further processing, is the molar mass distribution.

The molar mass distribution of *Eucalyptus globulus* kraft pulps is illustrated in FIG. 6.

Figure 7:
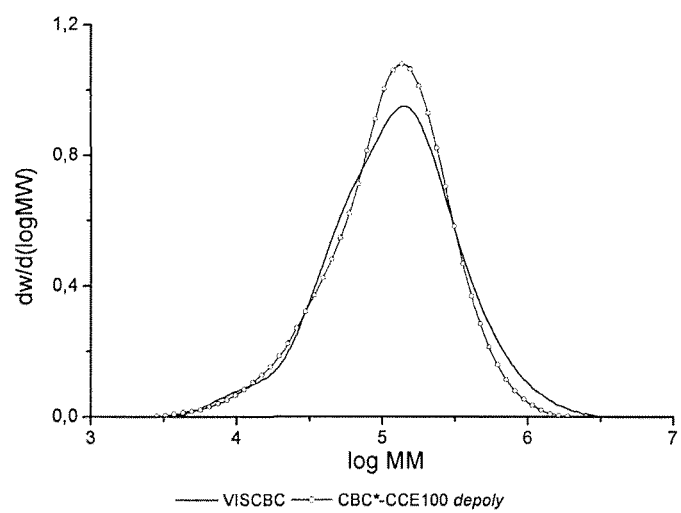
FIG. 7 shows the comparison of the molar mass distribution of a CBC* pulp with that of a VISCBC pulp.

The upper part of FIG. 6 shows unbleached CBC pulps which were produced according to a two-stage CBC cooking produced according to a prehydrolysis kraft process (VISCBC), shows (see FIG. 7) that the CCE treatment with the higher NaOH concentration level enables a narrower distribution (lower polydispersity) than in case of the reference pulps. In FIG. 7, a VISCBC pulp is compared to a "CBC* CCE100 Depoly" pulp as a CBC* pulp which has undergone a CCE process with 100 g/l of NaOH and has been subjected to a depolymerization treatment (TCF bleaching).

Further Processing into Regenerated Fibres
1. Viscose Fibres:

An important criterion for the further processing of dissolving pulps is the achievable viscose quality which has been evaluated on the basis of the filter value according to Treiber [Sixta, H., et al., *Evaluation of new organosols dissolving pulps. Part I: Preparation, analytical characterization and viscose processability*. Cellulose, 2004. 11(1): p. 73-83.], the average particle content and the particle distribution in an order of magnitude of 3-150 μm (determination with the aid of a PAMAS measuring instrument [Sixta et al., Cellulose, 2004. 11(1): p. 73-83]).

The following Table 3 shows that the steam activation treatment prior to CBC cooking constitutes the critical step for improving the resulting viscose quality. The subsequent CCE treatment leads to a further improvement of the viscose quality, whereby, as expected, the effect increases with a rising NaOH concentration.

TABLE 3

Viscose quality, measured on the basis of the filter value and the average particle volume of reference and test pulps

| Pulps | # | Filter value | Particle volume ppm |
|---|---|---|---|
| VISCBC reference | 73/05 | 364 | 28 |
| CBC reference | 14/05 | 34 | 156 |
| CBC* | 74/05 | 180 | 58 |

TABLE 3-continued

Viscose quality, measured on the basis of the filter value and the average particle volume of reference and test pulps

| Pulps | # | Filter value | Particle volume ppm |
|---|---|---|---|
| CBC*-CCE50 | 75/05 | 223 | 34 |
| CBC*-CCE100 | 15/05, 7/06 | 306 | 28 |

Table 3 shows that the quality of the viscose produced from the CBC*-CCE100 pulp is almost equivalent to that of the one produced from the VISCBC reference pulp. The viscoses were filtered and spun on a laboratory spinning machine with 20 hole (φ 50 μm) at a total of 4 different stretch ratios.

Figure 8:
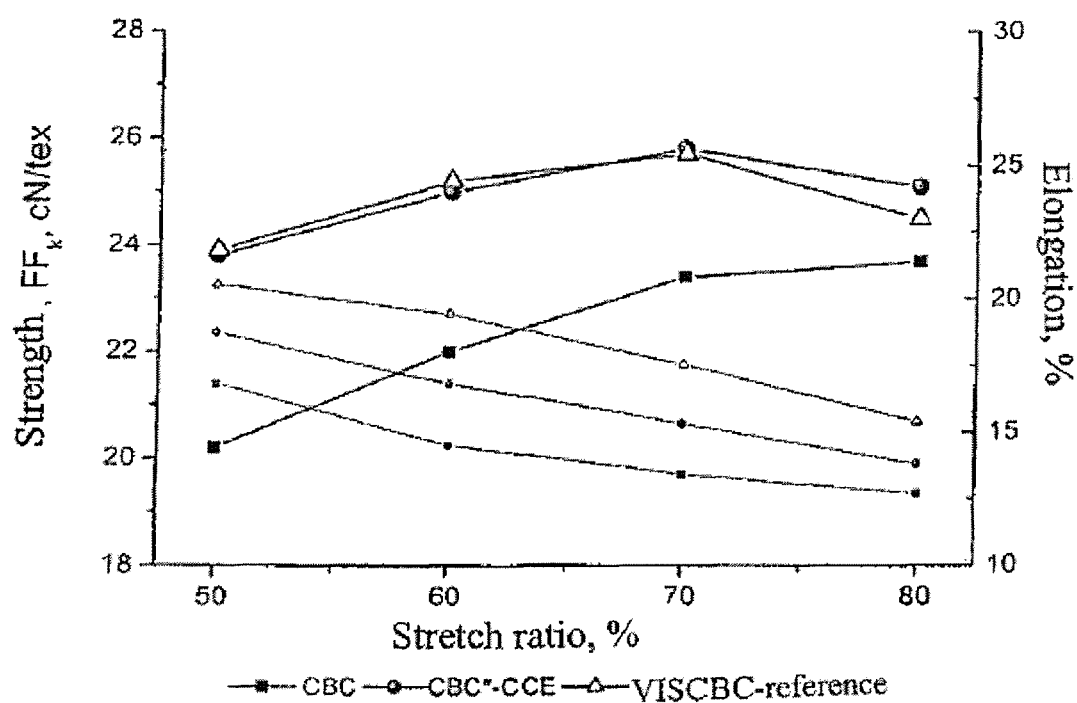
FIG. 8 shows the strengths of standard Viscose fibres produced from various pulps in the conditioned state.

The strengths of the produced standard Viscose fibres in the conditioned state are summarized in FIG. 8. Therein, fibres from
a) CBC paper pulp
b) CBC*-CCE pulp and a
c) VISCBC reference pulp
are contrasted with each other.

The results prove that the CBC*-CCE pulp is as good as the reference dissolving pulp (VISCBC), as far as a further processing into Viscose fibres is concerned. The slightly smaller fibre elongations can be traced back to a less complete filtration which is noticeable from a slightly increased amount of small particles in an order of magnitude of between 5 and 10 μm.

In the following table, the chemico-physical properties of the pulps used and of the Viscose fibres produced therefrom (according to a standard spinning process) are contrasted with each other:

TABLE 4

Chemico-physical properties of the pulps and of the Viscose fibres produced therefrom (standard quality).

| Parameters Type | Units | Pulps produced according to the invention | | Reference |
| | | Pulp 1 CBC*-CCE100 | Pulp 2 CBC*-CCE100 | Solucell PHK |
|---|---|---|---|---|
| Pulp | | Bl 269 | Bl276 | FEZ 1167 |
| Wood species | | E. globulus | E. globulus | E. urograndis |
| Whiteness | % ISO | 93.0 | 92.6 | 89.6 |
| Viscosity | ml/g | 441 | 411 | 421 |
| R18 | % | 98.1 | 98.4 | 97 |
| R10 | % | 96.5 | 96.8 | 93.35 |
| Xylan | % | 6.4 | 4.3 | 2.9 |
| Mannan | % | 0.4 | 0.5 | 0.0 |
| ZS Viscose fibre | | | | |
| Xylan | % | 3.8 | 2.8 | 0.7 |
| Mannan | % | 0.3 | 0.2 | 0.0 |
| Hemicellulose total | % | 4.1 | 3.0 | 0.7 |
| Titre | dtex | 1.3 | 1.3 | 1.3 |
| Tenacity (cond) | | | | |
| at 50% stretching | cN/tex | 23.8 | 24.3 | 23.9 |
| at 60% stretching | cN/tex | 25.0 | 25.6 | 25.2 |
| at 70% stretching | cN/tex | 25.8 | 25.7 | 25.7 |
| at 80% stretching | cN/tex | 25.1 | 25.1 | 24.5 |
| Elongation | | | | |
| at 50% stretching | % | 18.7 | 19.8 | 20.5 |
| at 60% stretching | % | 16.8 | 18.2 | 19.4 |
| at 70% stretching | % | 15.3 | 16.1 | 17.4 |
| at 80% stretching | % | 13.8 | 14.5 | 15.4 |
| Yield of mercerization | % | 94.8 | 96.7 | n.d. |

The pulp "Solucel" is a VISCBC pulp.

According to the invention, the content of hemicellulose is understood to be the sum of non-glucose-containing sugar ingredients (calculated as anhydro sugar) following a total hydrolysis (two-stage hydrolysis with sulfuric acid) of the pulp or the fibre, respectively. The measurement is performed via anion-exchange chromatography combined with a pulsed amperometry as a detection method. The measurement methodology is described in U. Mais, H. Sixta, ACS Symposium Series 2004, 864, 94, as well as in H. Sixta et. al. Proceedings of the 11th ISWPC 2001, vol. 3, pp. 655-658.

Method of Determining the Yield of Mercerization:
De-Finishing:

The fibres are extracted with 96% EtOH on a Soxhlet extractor for 3 h and dried under vacuum at 50° C. over night.

Yield of Mercerization:

2.00 g of de-finished fibres (initial weight $M_1$) is vigorously stirred (pestled) at 20° C. with a glass rod with 50 mL NaOH, having a concentration of 250 g/L, in a beaker for 3 minutes. Subsequently, the fibre slurry is sucked off via a G3 fit and washed neutrally with VE water. After the fibre has been dried, the fibre is weighed again (output weight $M_2$). The yield of mercerization is the quotient from $M_2/M_1$ (%).

Lyocell Fibres:

It is known that depolymerized kraft paper pulp is suitable for the production of high-quality Lyocell fibres [WO 99/47733]. An (optionally two-stage) kraft cooking with steam preactivation creates the basis for the production of Lyocell fibres with considerably better textile-mechanical properties. The results of spinnings in a Davenport laboratory spinning plant prove that a cold caustic extraction of kraft paper pulps raises the textile-mechanical properties to the level of Lyocell fibres made of the highest-quality dissolving pulps (VISCBC) (Table 5).

TABLE 5

Strength properties of Lyocell fibres produced from CBC paper and dissolving pulps with the aid of a Davenport laboratory spinning plant

| Pulps | # | Conditioned fibre data, 1.3 dtex | |
|---|---|---|---|
| | | Strength cN/tex | Elongation % |
| VISCBC reference | L66 | 40.7 | 12.7 |
| CBC reference | L32 | 30.0 | 10.1 |
| CBC*-CCE50 | L53_54 | 36.0 | 12.5 |
| CBC*-CCE100 | L22 | 41.0 | 10.4 |

The following table compiles the result of further experiments for the production of Lyocell fibres made of different pulps:

The pulp "High Hemi" is a pulp corresponding to the teaching of WO 99/47733. The pulp "Solucell" is a VISCBC pulp.

It is evident from the table that the Lyocell fibres spun from pulps produced according to the invention (CBC*-CCE100) exhibit excellent properties with regard to the fibre strength and the yield of mercerization comparable to those of Lyocell fibres made of a high-quality VISCBC pulp, despite a cheap production of the pulp and a higher hemicellulose content.

The Lyocell fibres according to the invention clearly exceed the properties of fibres produced from a pulp corresponding to the teaching of WO 99/47733.

Example 4

Controlled DP-adjustment of High-yield Dissolving Pulps

In laboratory tests, the behaviour of ozone bleaching and electron irradiation ("Beam") with regard to the DP-degradation of OP-(CCE)-A and OP-(CCE)-D, respectively, prebleached CBC, CBC*-CCE50 and CBC*-CCE100 pulps was compared to each other. By way of comparison, a softwood sulfite pulp ("LH sulfite") was also exposed to electron irradiation.

Ozone bleaching was thereby carried out by mixing in a high-shear mixer under fluidizing conditions, in each case with a stock density of 10% and a pH of 2.0.

The EBeam treatment was performed at an accelerating voltage of 10 MeV in a Rhodotron Accelerator by Messrs. IBA SA, Louvain-La-Neuve, after the pulp sheets had been dried.

All pulps were subjected to peroxide bleaching after the Z or EBeam treatment, respectively (70° C., 10 kg NaOH/t, 7 kg H2O2/t, 120 min, 10% stock density, 0.5 kg Mg II ions/t).

TABLE 6

Chemico-physical properties of the pulps and of the Lyocell fibres produced therefrom

| Parameters Type | Units | Pulps produced according to the invention | | Reference | |
|---|---|---|---|---|---|
| | | Pulp 1 CBC*-CCE100 | Pulp 2 CBC*-CCE100 | High Hemi Kraft | Solucell PHK |
| Pulp | | Bl 269 | BL294 | ZF1761 | FEZ147/99 |
| Wood species | | E. globulus | Beech | Southern Pine | E. urograndis |
| Whiteness | % ISO | 93.0 | 92.7 | 88.8 | 90.2 |
| Viscosity | ml/g | 441 | 350 | 451 | 415 |
| R18 | % | 98.1 | 97.3 | 86.9 | 96.9 |
| R10 | % | 96.5 | 95.1 | 82.9 | |
| Xylan | % | 6.4 | 4.7 | 8.5 | 3.3 |
| Mannan | % | 0.4 | 0.2 | 5.6 | 0.0 |
| Hemicellulose total | | 6.8 | 4.9 | 14.1 | 3.3 |
| Lyocell fibre | | Laboratory | Pilot plant | Pilot | Laboratory |
| Xylan | % | n.d. | 4.1 | 7.8 | 3.1 |
| Mannan | % | n.d. | 0.2 | 5.3 | 0.0 |
| Hemicellulose total | | | 4.3 | 13.1 | 2.9 |
| Fibre properties | | | | | |
| Titre | dtex | 1.3 | 1.3 | 1.3 | 1.3 |
| Tenacity (cond) | cN/tex | 41.0 | 39.7 | 31.7 | 42.7 |
| Elongation | % | 10.4 | 11.8 | 11.7 | 12.7 |
| Yield of mercerization | % | n.d. | 95.2 | 86.7 | 96.4 |

Figure 9:
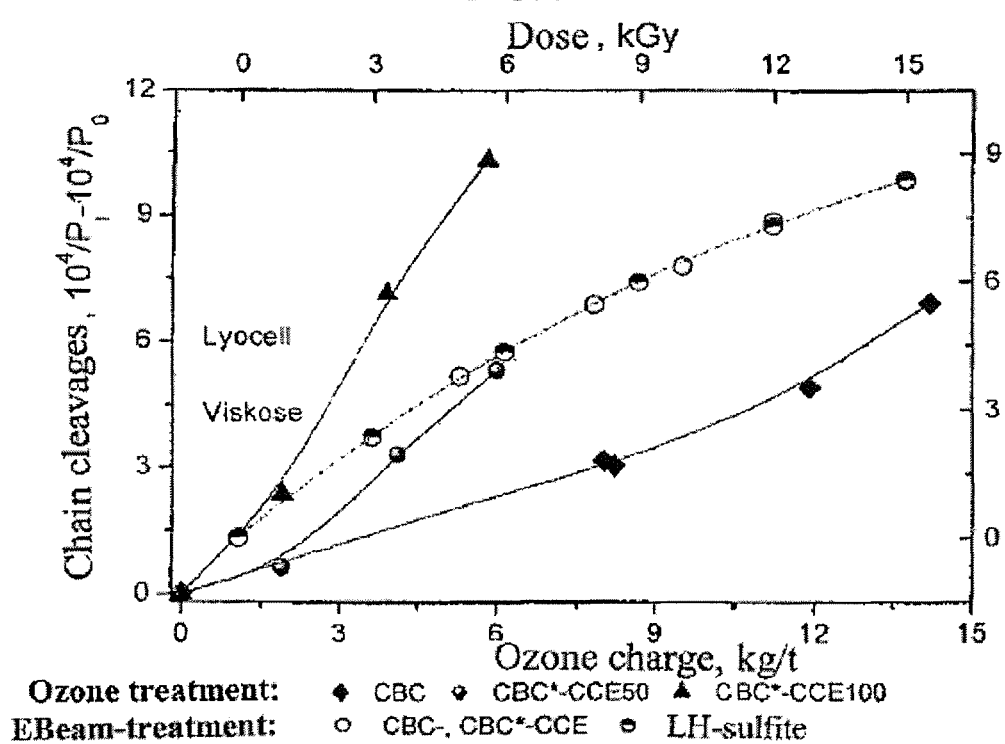
FIG. 9 illustrates the influence of the ozone amount used and the radiation dose on the DP-degradation of CBC and LH sulfite pulps which have been pretreated differently.

The results in FIG. 9 show that the extent of the chain cleavages (KSP, calculated according to formula $10^4/P_j - 10^4/P_0$ (P≅DPv calculated from SCAN GVZ values; $_j$ ... after degradation, $_0$ ... prior to degradation)) depends very strongly on the concentration of hemicelluloses (and also lignin, not illustrated) in the pulp as a function of the ozone amount used. The higher the hemicellulose content, the higher the ozone charge for achieving a particular KSP.

The CBC-CCE100 pulp low in hemicellulose requires only about 3 kg $O_3$/t for a KSP of 5.6 (GVZ degradation from 750 ml/g to 420 ml/g), whereas a CBC pulp with a xylan content four times as high (see Table 2) requires more than 12 kg $O_3$/t for the same degrading effect.

The electron irradiation is different, however: The dose required for a particular DP-degradation is largely independent of the type and the composition of the pulp.

Table 7 confirms the stabilizing effect of an alkaline peroxide treatment following the degradation processes on the basis of the copper number and carboxyl group contents. After both degradation processes, the P-stage brings about an additional KSP of approx. 0.6-1.2, depending on the respective conditions.

TABLE 7

Copper number and carboxyl group content of CBC*-CCE100 pulps following a Z, EBeam or subsequent alkaline peroxide bleaching, respectively

| OP-CCE100-A-Z-P | | Z | P |
|---|---|---|---|
| Copper no. | % | 0.85 | 0.72 |
| COOH | mmol/kg | 34 | 37 |

| OP-CCE100-D-Ebeam-P | | Ebeam | P |
|---|---|---|---|
| Copper no. | % | 0.79 | 0.65 |
| COOH | mmol/kg | 33 | 40 |

Figure 10:
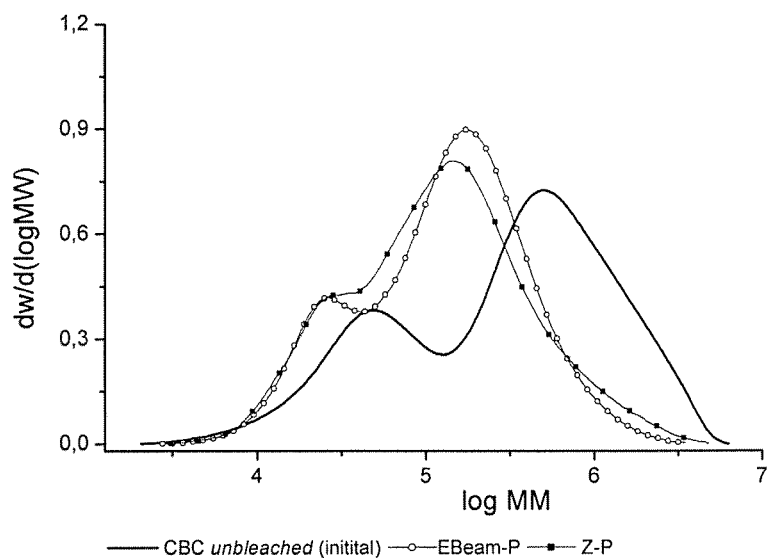
FIG. 10 shows the molar mass distribution of a CBC pulp which has been degraded to an intrinsic viscosity number of 440 ml/g by means of EBeam and ozone.

The advantage of the electron irradiation manifests itself in the clearly narrower DP distribution of the finished pulps. FIG. 10 shows that the CBC paper pulp depolymerized by means of EBeam exhibits a considerably narrower distribution than a CBC pulp broken down with ozone. With a degradation to a GVZ of 440 ml/g, the polydispersity index (PDI) amounted to 4.3 in case of the Z-treated pulp and amounted only to 3.5 in case of the EBeam-treated pulp. In each case, the analysis was performed on the finished pulp after a final P-stage.

Example 5

Production of High-yield Paper Pulp

The use of a cooking liquor rich in hemicellulose in the second cooking stage causes primarily an increase in the pulp yield. As is explained in Example 2, the average yield increase (at a hemi-concentration of approx. 10 g/l in the cooking liquor) is approx. 2 percentage points in comparison to the single-stage variant across a wide kappa number range (see FIG. 4).

The reprecipitation of xylan on the pulp surface is clearly identifiable as an increase in the low-molecular fraction in the molar mass distribution, see upper part of FIG. 6, and influences both the surface properties and the mechanical strengths. The high uronic acid content (GlcA) of the xylans (Xyl), GlcA:Xyl ratio approx. 0.05:1, causes an increase in the hydrophilicity of the pulp surface.

Example 6

Production of Xylan Products

1. Isolation of Xylan from the CCE Filtrate

With the aid of a pilot nanofiltration plant (NF) equipped with a polyethersulfone membrane, Nadir N30 F, cut-off 300, a CCE filtrate was prefiltered using a cartridge filter (Profile Star AB1A4007J) in order to filter out remaining fibres and undissolved particles.

The NF plant was operated at a temperature of 40° C., a pressure of 25 bar and a specific flow rate of 5 $l/m^2 \cdot h$. The beta-cellulose (xylan) concentration in the feed amounted to approx. 15 g/l, the NaOH concentration was 90 g/l. The ratio of flow and hence also the liquor loads in the permeate to the retentate were 0.82:0.18.

Due to the low cut-off of the membrane, the total amount of beta cellulose in the retentate was at a concentration of about 85 g/l. The retentate was diluted with water at a ratio of 1:1.5 and again was supplied to the NF.

The NF conditions of the second stage were comparable to those of the first stage, with the exception that the amount of permeate dropped to about 70% of the feed amount. In the retentate of the second NF stage, the beta cellulose was now present at a concentration of about 115 g/l and at a NaOH concentration of about 32 g/l (hemi liquor).

Said substrate served for the isolation of the beta-cellulose (xylan) by reverse precipitation with mineral acid. For this purpose, approximately 0.1 parts of a sulfuric acid diluted 1:3 with water were mixed with 1 part of hemi liquor, whereby a pH of between 4 and 5 appeared in the end.

Figure 11:
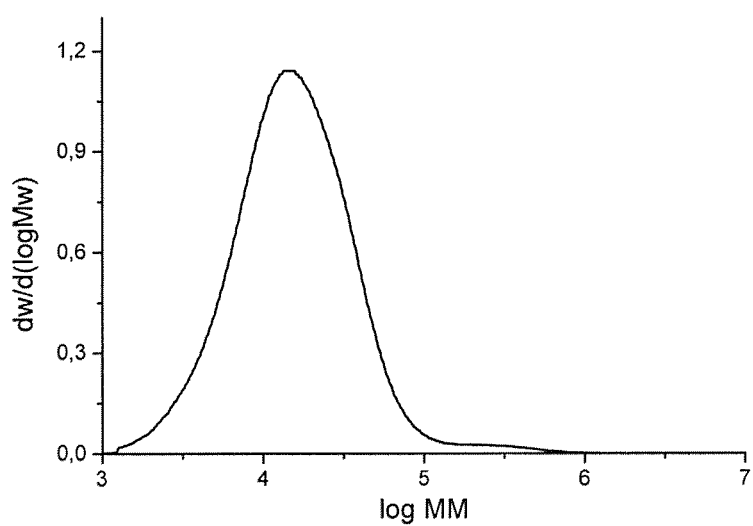
FIG. 11 shows the molar mass distribution of a xylan isolated in mineral acid from a CCE filtrate by reverse precipitation.

After about 6-8 h, an off-white precipitate with a consistency of approx. 10-15% by weight forms. Said precipitate was then centrifuged, washed and dried. A xylan content of 74% by weight was detected in this solid substance. Based on the total carbohydrate content, the xylan content amounted to 97.5%. The molar mass distribution of said xylan powder as determined by GPC shows a weight-average molecular mass of 24.4 kg/mol and a number-average molecular mass of 10.6 kg/mol (see FIG. 11).

2. Further Processing of the Xylan Powder into Xylo-Oligosaccharides (XOS)

XOS was produced from the xylan in two ways, (A) hydrothermolytically, (B) enzymatically:

(A) Hydrothermolytic XOS Production:

318 g of dry xylan was diluted in 9.08 L water (xylan concentration 35 g/L) and was treated in an 11 L-pressure reactor at 120° C. for 5 h under continuous circulation. The circulation flow rate was 75 L/h. Upon completion of the reaction, the pH value of the hydrolysate was 3.13.

Subsequently, the solution was neutralized with 0.3 N NaOH to pH 6.5-7.0. The water-soluble products were spun down at 4000 U/min for 60 min. The isolated amount of XOS was 189.7 g of a freeze-dried powder, corresponding to a yield of 59.6%, based on the xylan used. The XOS mixture produced hydrothermolytically exhibits a relatively uniform composition across the examined DP-range (see bottom part of Table 8).

(B) Enzymatic Hydrolysis:

$XOS_{2-10}$ 90 g of wet xylan (equal to 40 g of dry xylan) was suspended in 900 mL water (44.4 g/L) and 50 mg Pentopan Mono BG (1.25 mg/g xylan) was added. The mixture was stirred in a fermenter at 50° C. for 2 h. Thereupon, the enzyme was inactivated by 10 minutes of heating to 99° C. The remaining insoluble portions were spun down, the aqueous solution was freeze-dried. The yield of XOS, based on the xylan used, amounted to 75%.

XOS$_2$

The reaction was carried out in a 7 L-fermenter with a filling of 6 L, the xylan concentration amounted to 20 g/L (120 g xylan). The production was likewise effected with the enzyme Pentopan Mono BG, but with an increased concentration of 1 g/L (50 mg/g xylan). Fermentation was carried out at 40° C. for 96 h. Reprocessing occurred as described above. The yield of XOS amounted to 78%, based on the amount of xylan used (93.66 g XOS). The product consists primarily of xylobiose (Table 8).

TABLE 8

Relative mass fractions of individual neutral XOS

| Product distribution | Hydro-thermally | Enzymatically XOS$_{2-10}$ | XOS$_2$ |
|---|---|---|---|
| | | % by weight | |
| X1 | 11.2 | 0.1 | 4.7 |
| X2 | 9.7 | 13.0 | 83.1 |
| X3 | 10.6 | 21.0 | 12.2 |
| X4 | 12.2 | 16.0 | |
| X5 | 12.5 | 11.0 | |
| X6 | 12.0 | 7.9 | |
| X7 | 12.6 | 7.2 | |
| X8 | 10.3 | 7.2 | |
| X9 | 9.0 | 6.9 | |
| X10 | | 9.7 | |
| XOS | 100.0 | 100.1 | 100.0 |

Example 7

Molar Mass Distribution (MMV) of Hemicelluloses (Xylans), Isolated from Pulps and Fibres Produced According to the Invention The use of the new generation of dissolving pulps of category "CBC*-CCE" for the production of high-strength Lyocell textile fibres can be demonstrated clearly based on the molar mass distribution (MMV) of the hemicelluloses isolated from the fibres (in case of softwoods those are almost exclusively xylans) in combination with the high strengths and the high yield of mercerization.

The hemicelluloses are extracted from the substrates (pulp or fibres, respectively) with the aid of DMSO according to the method of D. Evtuguin et. al. (*Carboh. Res.* 338 (2003) 597) and are purified. Beforehand, the fibres are also definished with EtOH (25 g Soxhlet with 1 L EtOH, 6 h). The isolated xylan (45 mg) is suspended in DMAc (1 mL) and dissolved in a molecularly disperse manner by adding LiCl (8 mg) at room temperature. The molar mass distribution is determined via GPC under the following conditions: solvent: LiCl/DMAc; temperature: room temperature; separating column: Mixed A from Polymer Labs; detection: MALLS (Wyatt)/RI; refractive index increment: 0.136 mL/g.

Figure 12:
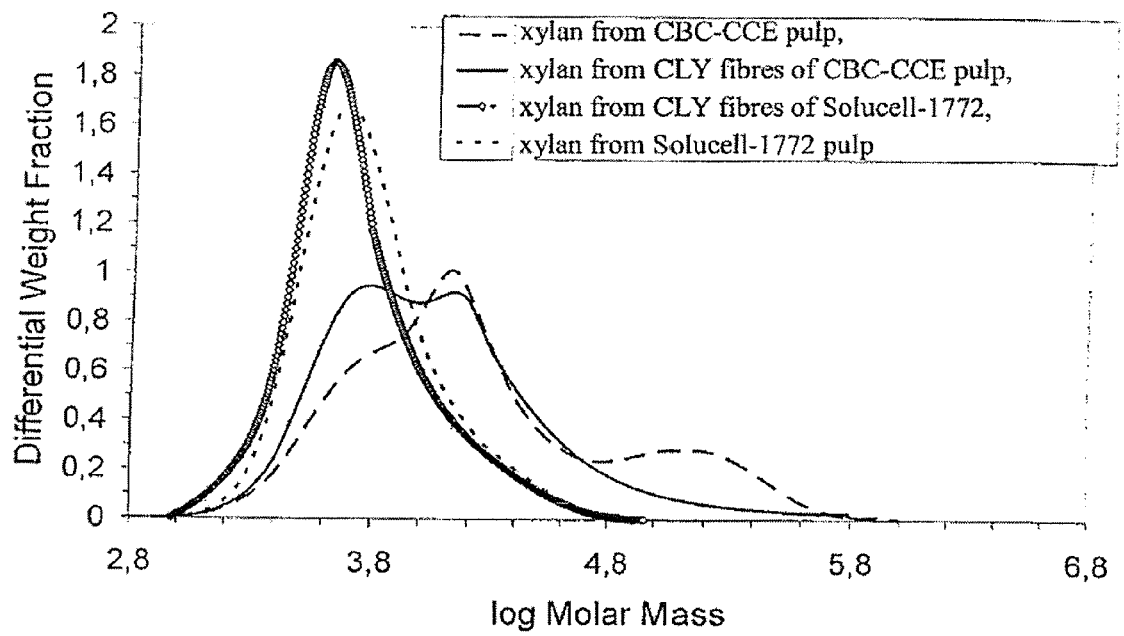
FIG. 12 shows the molar mass distribution of the xylans isolated from pulps and fibres produced therefrom by means of DMSO (graphical evaluation of the GPC analysis).
Figure 13:
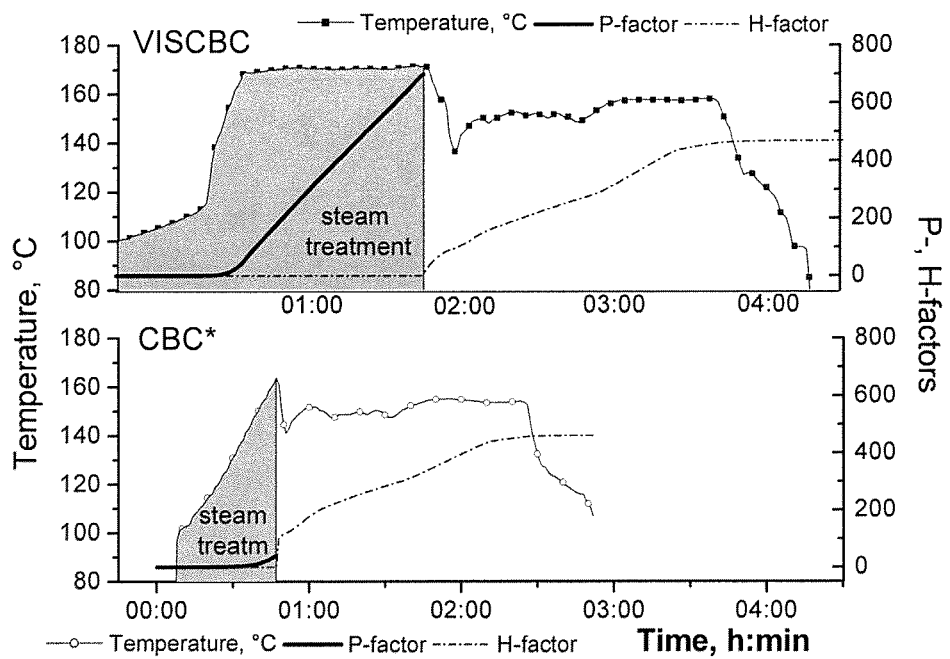
FIG. 13 contrasts the intensity of the preferred steam treatment (CBC*) according to the invention with a prehydrolysis process (VISCBC). The P-factor of the steam treatment preferred according to the invention is below 50; the P-factor of the VISCBC prehydrolysis amounts to 700.

The results of the MMV determination of the hemicelluloses isolated from pulps and Lyocell fibres produced therefrom are summarized in Table 9 and FIG. 12.

TABLE 9

MMV of xylans isolated from pulps and Lyocell fibres produced therefrom by means of DMSO: numerical evaluation of weight and number average

| Parameters Type | Units | Pulp produced according to the invention CBC*-CCE100 | Conventional pulp Solucell PHK |
|---|---|---|---|
| Pulp | | BL294 | ZFAT1772 |
| Wood species | | Beech | E. urograndis |
| Xylan | % | 4.7 | 2.8 |
| DMSO xylan extract | | | |
| Mw (GPC: LiCl/DMAc) | g/MoL | 44,750 | 7,900 |
| Mn (GPC: LiCl/DMAc) | g/MoL | 9,800 | 5,100 |
| PDI (Mw/Mn) | | 4.6 | 1.5 |
| Lyocell fibre | | Pilot plant | Production |
| Xylan | % | 4.1 | 2.9 |
| DMSO xylan extract | | | |
| Mw (GPC: LiCl/DMAc) | g/MoL | 24,700 | 7,200 |
| Mn (GPC: LiCl/DMAc) | g/MoL | 7,850 | 4,500 |
| PDI (Mw/Mn) | | 3.1 | 1.6 |

The pulp "Solucell-1772" is a VISCBC pulp.

The results of GPC measurements of the xylans isolated from pulp and fibres permit the following conclusions:
- The profile of the xylan-MMV in the pulp is reflected—despite a degradation—in the fibre.
- Xylans from CBC*-CCE pulps are substantially higher-molecular and more polydisperse than those made of conventional prehydrolysis kraft pulps (PHK).
- Xylans from Lyocell fibres produced by using a CBC*-CCE pulp exhibit a weight average (Mw) of ≥20 kDa. In contrast, xylans from Lyocell fibres which originate from PHK pulps (or also sulfite pulps) which are commercial today exhibit a weight average (Mw) of ≤10 kDa.

What is claimed is:

1. A process for producing a lyocell fiber from a dissolving pulp, comprising the step of cooking a cellulosic starting material with a cooking liquor in a kraft process to obtain the dissolving pulp, wherein the cellulosic starting material is exposed to a steam treatment prior to cooking, wherein the steam treatment consists of applying a temperature of 120° C. or more and a P-factor of 50 or less, wherein the dissolving pulp obtained by cooking is subjected to cold caustic extraction (CCE) in the course of further processing whereby a CCE treated dissolving pulp is formed, and wherein the lyocell fiber having a content H of hemicellulose of more than 3.5% by weight and less than 5% by weight is produced from the CCE treated dissolving pulp.

2. The process according to claim 1, further comprising treating the dissolving pulp obtained by cooking to adjust the degree of polymerization (DP).

3. The process according to claim 1, wherein, for the steam treatment, the cellulosic starting material is treated with medium-pressure steam at a temperature of from 150 to 180° C.

4. The process according to claim 1, wherein the cellulosic starting material is subjected to an impregnation prior to cooking.

5. The process according to claim 1, wherein the cooking, the steam treatment and optionally an impregnation of the cellulosic starting material are carried out in the same cooker.

6. The process according to claim 1, wherein the cooking is carried out in a form of continuous batch cooking (CBC).

7. The process according to claim 1, wherein at least a portion of a press liquor formed in the cold caustic extraction is purified using a membrane separation process.

8. The process according to claim 7, wherein the membrane separation process is nanofiltration.

9. The process according to claim 7, wherein the membrane separation process is an ultrafiltration.

10. The process according to claim 1, wherein at least one of a portion of a press liquor formed in the cold caustic extraction and a portion of a retentate of a membrane separation process performed on the press liquor is supplied to the cooking liquor of a linked cooking process carried out for the production of paper pulp.

11. The process according to claim 1, further comprising bleaching the pulp obtained by cooking.

12. The process according to claim 1, wherein the cooking step of the pulp is carried out in two stages, and wherein, in a first stage, a delignification using a first cooking liquor to a kappa number of from 35 to 70 in case of softwoods as the cellulosic starting material and to a kappa number of from 30 to 60 in case of hardwoods as the cellulosic starting material is carried out and, in a second stage, the cooking is continued to the desired degree of purity of the pulp, using a second cooking liquor.

\* \* \* \* \*